United States Patent
Sugawara

(10) Patent No.: US 7,940,364 B2
(45) Date of Patent: May 10, 2011

(54) DEVICE WITH FLEXIBLE CIRCUITS HAVING PROTECTOR AND MANUFACTURING METHOD THEREOF

(75) Inventor: Hideaki Sugawara, Kanagawa (JP)

(73) Assignee: NEC LCD Technologies, Kanagawa (JP)

(*) Notice: Subject to any disclaimer, the term of this patent is extended or adjusted under 35 U.S.C. 154(b) by 310 days.

(21) Appl. No.: 12/212,696

(22) Filed: Sep. 18, 2008

(65) Prior Publication Data

US 2009/0080148 A1    Mar. 26, 2009

(30) Foreign Application Priority Data

Sep. 20, 2007 (JP) ................................. 2007-243867

(51) Int. Cl.
*G02F 1/1333* (2006.01)
*G02F 1/1345* (2006.01)
*G09G 3/36* (2006.01)

(52) U.S. Cl. ........ 349/150; 349/149; 349/151; 349/152; 345/104

(58) Field of Classification Search ................... 349/58, 349/149–152; 345/104
See application file for complete search history.

(56) References Cited

U.S. PATENT DOCUMENTS

| | | | | |
|---|---|---|---|---|
| 5,838,412 A * | 11/1998 | Ueda et al. | ..................... | 349/150 |
| 6,522,543 B2 * | 2/2003 | Kurihara et al. | ............... | 361/704 |
| 6,819,371 B2 * | 11/2004 | Kanatsu | .......................... | 349/58 |
| 7,234,945 B2 * | 6/2007 | Azuma et al. | ................... | 439/67 |
| 7,777,400 B2 * | 8/2010 | Kim | ................................ | 313/36 |
| 2001/0002145 A1 * | 5/2001 | Lee et al. | ........................ | 349/58 |

FOREIGN PATENT DOCUMENTS

| | | |
|---|---|---|
| JP | 2003-167230 | 6/2003 |
| JP | 2006-100664 | 4/2006 |

* cited by examiner

*Primary Examiner* — Hoan C Nguyen
(74) *Attorney, Agent, or Firm* — Young & Thompson

(57) ABSTRACT

A device includes a module, a flexible unit fixed on a fixing part of which relative position to a position of the module is variable, a casing covering the module and the flexible unit, and a protector which is made of material having less scratch hardness than material of the casing. The protector has a fixing part, a protruding part and a protecting part. The fixing part, which is a part of a first surface of the protector, is fixed on the casing. The protruding part, which is a part of the protector, protrudes from an edge of the casing. The protecting part, which is a part of a second surface behind the first surface excluding the protruding part, contacts with the flexible unit.

22 Claims, 16 Drawing Sheets

DEVICE WITH FLEXIBLE CIRCUITS HAVING PROTECTOR AND MANUFACTURING METHOD THEREOF

INCORPORATION BY REFERENCE

This application is based upon and claims the benefit of priority from Japanese Patent Application No. 2007-243867, filed on Sep. 20, 2007, the disclosure of which is incorporated herein in its entirety by reference.

TECHNICAL FIELD

The present invention relates to a device and in particulars, relates to a device provided with a casing covering a flexible part, and a manufacturing method for the same.

BACKGROUND ART

Generally, a device is provided with a casing which covers a module thereinside. Such a casing that covers the inside of the device may be called a case, a cover, a cabinet, an enclosure, a package, housing, a box, etc. according to the kind of the device. The casing has high mechanical strength and protects a module inside the device. Therefore, when a worker covers the module in a device with a casing in order to assemble the device, the casing may contact the module and damage the module. Accordingly, the device needs a mechanism to prevent such damage. A case in which the above-mentioned problem may occur is described below using a liquid crystal display (LCD) device as a specific example.

An LCD device includes features like a thin shape, a light weight, and low power consumption, and is used in wide range of fields, such as office automation (OA) equipment, audiovisual (AV) equipment, and portable terminal equipment. For example, the LCD device includes an LCD panel, a backlight, a circuit element and an outside casing, as main components. The liquid crystal panel includes two substrates facing each other and liquid crystal sandwiched therebetween. The backlight includes a light source, optical members such as a reflecting sheet and a diffusion sheet, an inside resin casing which holds and fixes above mentioned parts. The circuit element includes a driver chip for driving the LCD panel, a driving circuit substrate and the like. The outside casing is made of a hard material, such as a metal, which holds and fixes the LCD panel, the backlight, the circuit element, etc.

The driving circuit substrate is installed in a rear face of the backlight. The liquid crystal panel and the driving circuit substrate are connected to each other via a substrate in which conductive wirings, such as a copper foil, are formed on a flexible resin film of a polyimide etc. Hereafter, such a substrate having flexibility is called a "flexible substrate". The driver chip is mounted on the flexible substrate. Such structure of a flexible substrate is disclosed in Japanese Patent Application Laid-Open No. 2006-100664 (patent document 1).

Including a resin film as a base material, a flexible substrate is susceptible to being damaged. A driver chip is readily affected by impact, vibration, and the like. Therefore, in the LCD device of the patent document 1, a space is usually made between the inside casing and the outside casing of the LCD device. The space is located on the side face of the LCD panel and the backlight. The flexible substrate and the driver chip on it are housed in the space, and do not have contact with the adjacent structural members, in particular, the outside casing made of a hard material, such as a metal.

A recent LCD device is required to narrow the bezel (outside margin around the display screen). Thus, it is difficult to secure enough space near the side face of the LCD panel and the backlight. Therefore, the flexible substrate or the driver chip may have contact with the outside casing during assembly of the LCD device. Then, defects, such as breaking of the trace on the flexible substrate or damage of the driver chip occur.

FIGS. 17 and 18 are cross sectional views showing structures of the LCD device of Japanese Patent Application Laid-Open No. 2003-167230 (patent document 2). In the LCD device of the patent document 2, as shown in FIG. 17, a protective cover 25 is arranged on the inner surface of an outside casing (bezel 24). A first fixing part 25a of the protective cover 25 is fixed to the inner surface of a pendent part 24a of the bezel 24, and a second fixing part 25c is fixed to the back of an inside casing (plastic chassis 27). A non-fixing part 25b between the first fixing part 25a and the second fixing part 25c protects a TAB (tape automated bonding) substrate 23 and an IC chip 23a such as a driver chip. A TAB substrate is a flexible wiring substrate having TAB.

As shown in FIG. 18, which shows another structure of the LCD device of the patent document 2, the inner surface and the external surface of the edge of the pendent part 24a of the bezel 24 are covered with a masking tape 26. In such structure, the TAB substrate 23 and the IC chip 23a do not directly touch the pendent part 24a of the bezel 24.

SUMMARY

An exemplary object of the present invention is to provide a device that can prevent damage inside the device at the time of assembly thereof.

A device according to an exemplary aspect of the invention includes a module performing a predetermined function, a flexible unit fixed on a fixing part, of which relative position to a position of the module is variable, a casing covering the module and the flexible unit, and a protector which is made of material having less scratch hardness than material of the casing. And the protector has a fixing part, which is a part of a first surface of the protector, fixed on the casing, a protruding part, which is a part of the protector, protruding from an edge of the casing, and a protecting part, which is a part of a second surface behind the first surface excluding the protruding part, contacting with the flexible unit.

A method for assembling a device according to another exemplary aspect of the invention includes contacting a protruding part of a protector of the device with a flexible unit of the device, and contacting a protecting part of the protector which excludes the protruding part with the flexible unit, after the contacting of the protruding part. And the protector is made of material having less scratch hardness than material of a casing covering a module of the device, of which a part is fixed on the casing, and the protruding part protrudes from an edge of the casing.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

1. First Exemplary Embodiment

An LCD device of a first exemplary embodiment of the present invention will be described with reference to FIGS. 1 to 8.

Figure 1:
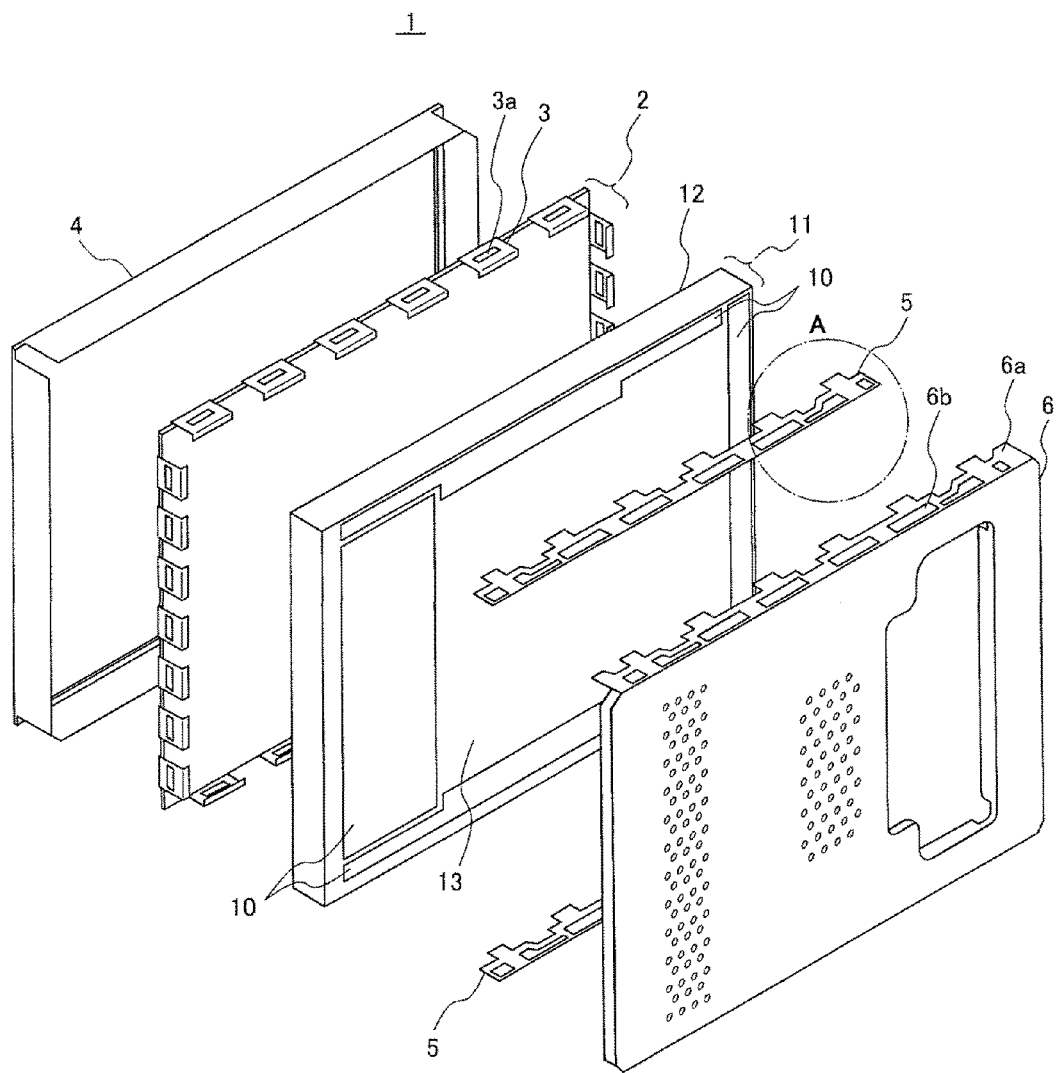
FIG. 1 is an exploded perspective view showing a structure of an LCD device according to a first exemplary embodiment of the present invention.

As shown in FIG. 1, the LCD device 1 of the exemplary embodiment includes an LCD panel 2 for displaying, a backlight 11 which is a light source for illuminating the LCD panel 2, a flexible substrate 3, a driving circuit substrate 10, a casing (hereafter, referred to as frame 4), a casing (hereafter, referred to as a cover 6), and a protector 5 as main components. The flexible substrate 3 which is connected to an edge part of the LCD panel 2 mounts an electric circuit component (hereafter referred to as an IC chip 3a) such as a driver chip thereon. The driving circuit substrate 10 is fixed on a back surface of the backlight 11. Signals are sent from the driving circuit substrate 10 to the LCD panel 2. The frame 4 is made of a hard material, such as a metal represented by aluminum, titanium, and stainless steel in order to hold and fix internal components. The frame 4 is fitted on a display surface of the LCD panel 2. The cover 6 is made of a hard material, such as a metal represented by aluminum, titanium, and stainless steel in order to hold and fix internal components. The cover 6 covers the driving circuit substrate 10 from the side of the rear face of a backlight 11. The protector 5 is fixed to an inside face of a side of the cover 6.

The LCD panel 2 includes a TFT (Thin Film Transistor) substrate 2a, a CF (Color Filter) substrate 2b and a liquid crystal sandwiched between the substrates. The TFT substrate 2a is a substrate on which switching elements such as TFTs or the like are formed. The CF substrate 2b is a substrate on which a color filter and a black matrix are formed.

The TFT substrate 2a includes scanning lines (gate) and signal lines (drain). The TFT substrate 2a connects with a gate driver which controls a gate of the TFT and a source driver which supplies voltage to a drain of the TFT in order to apply desired voltage on the liquid crystal. Each driver includes the flexible substrate 3 represented by a TCP (Tape Carrier Package) or a COF (Chip on Film). A driving IC chip 3a is fixed on the flexible substrate 3. In order to protect electrodes of the IC chip 3a, a protecting resin is applied so as to cover a whole area or a part of peripheral area of the IC chip 3a.

The backlight 11 includes a light source, optical members, such as a light guide plate for guiding a light of the light source to the LCD panel 2, and a reflecting sheet, a resin casing (a center frame 12 and a rear frame 13) for holding and fixing the members. A CCFL (cold cathode fluorescent lamp) and an LED (light emitting diode) or the like are used for the light source. The driving circuit substrate 10 is fixed on a rear face of the rear frame 13. Incidentally, the kind or the luminescence method (direct type, or the like) of the light source used for the backlight 11 are not specified. Any light sources and any luminescence methods can be applied to the present invention.

An assembling method of the LCD device 1 will be described with reference to FIG. 2. First, the LCD panel 2 is arranged on the center frame 12 of the backlight 11. Next, the flexible substrate 3 connected to an area exposed on a display surface of the LCD panel 2 (hereinafter, referred to as a side of display surface) is bent at a flexing position 3d toward a side of the LCD panel 2 and the backlight 11. The side of display surface is an edge area of a face of the TFT substrate 2a facing the CF substrate 2b, for example. Moreover, the flexible substrate 3 is bent toward a rear face of the backlight 11, and is connected to the driving circuit substrate 10. After that, the cover 6 is attached on the rear face of the backlight 11. The cover 6 is engaged with either or both of the center frame 12 and the rear frame 13. The frame 4 is attached on the side of display surface of the LCD panel 2 and is engaged with the cover 6. In such way, as shown in FIG. 3 and FIG. 4 (cross sectional view taken along plane B in FIG. 3), assembly of the LCD device 1 is completed.

As mentioned above, the flexible substrate 3 runs from the display surface of the LCD panel 2 to the side faces of the LCD panel 2 and the backlight 11, and is connected to the driving circuit substrate 10 fixed on the rear face of the backlight 11. After connection of the flexible substrate 3, the cover 6 is attached on the rear face of the backlight 11. If an edge of the side face (cover side face 6a) of the cover 6 made of a hard material such as a metal comes in contact with the flexible substrate 3 or the IC chip 3a, the flexible substrate 3 or the IC chin 3a may be damaged.

Figure 3:
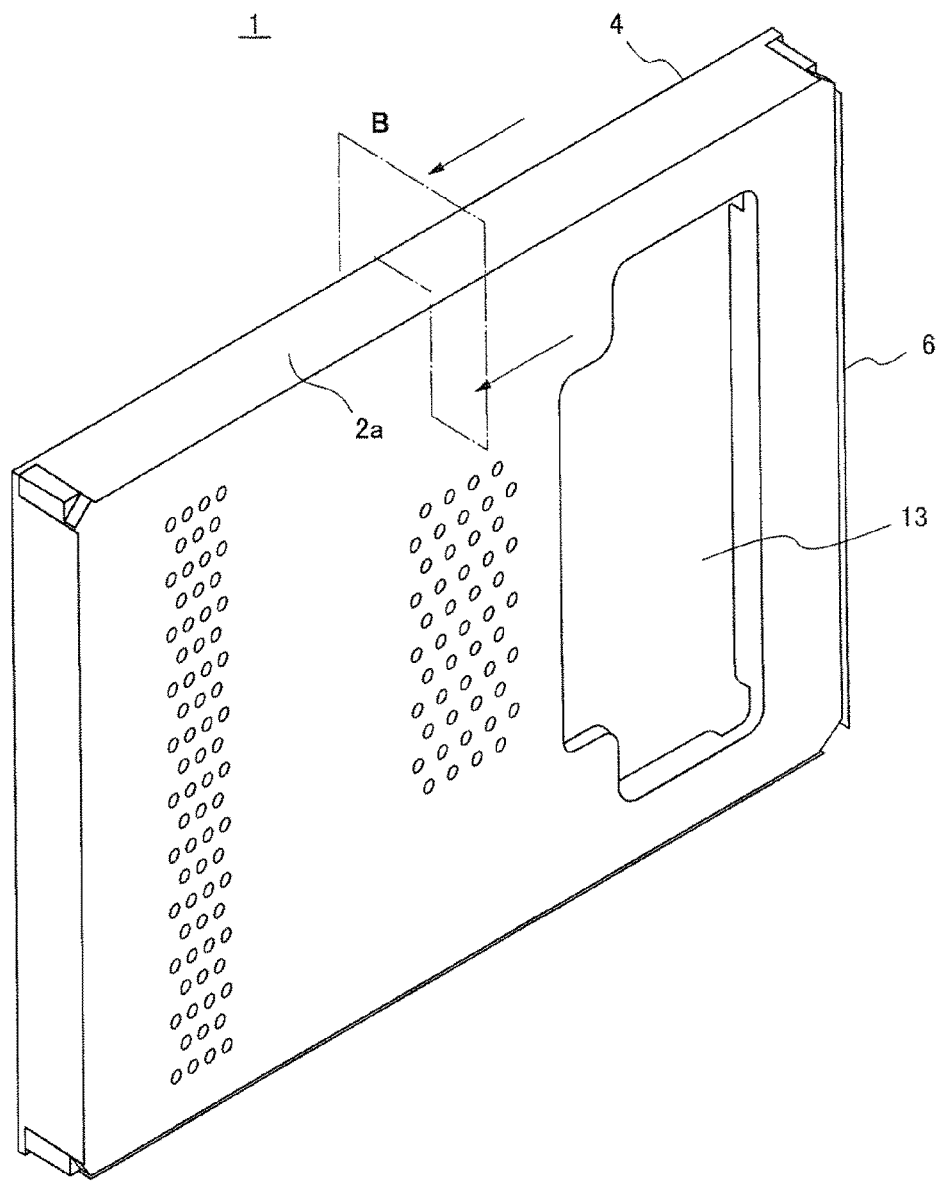
FIG. 3 is a perspective view showing a state after assembly of the LCD device according to the first exemplary embodiment of the present invention.
Figure 4:
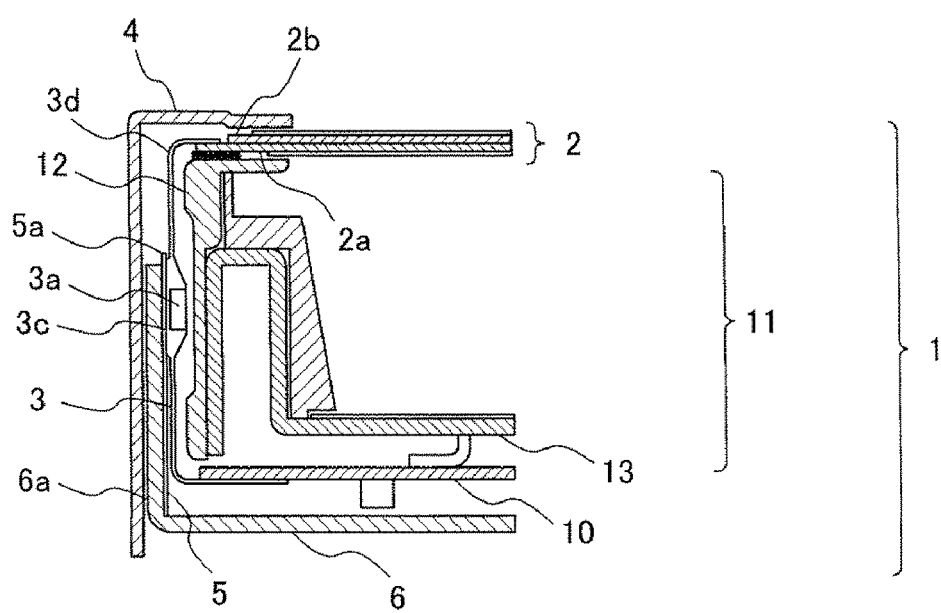
FIG. 4 is a cross sectional view showing a state after assembly of the LCD device according to the first exemplary embodiment of the present invention and is a cross sectional view taken along plane B in FIG. 3 and viewed in the direction indicated by the arrows in FIG. 3.
Figure 5:
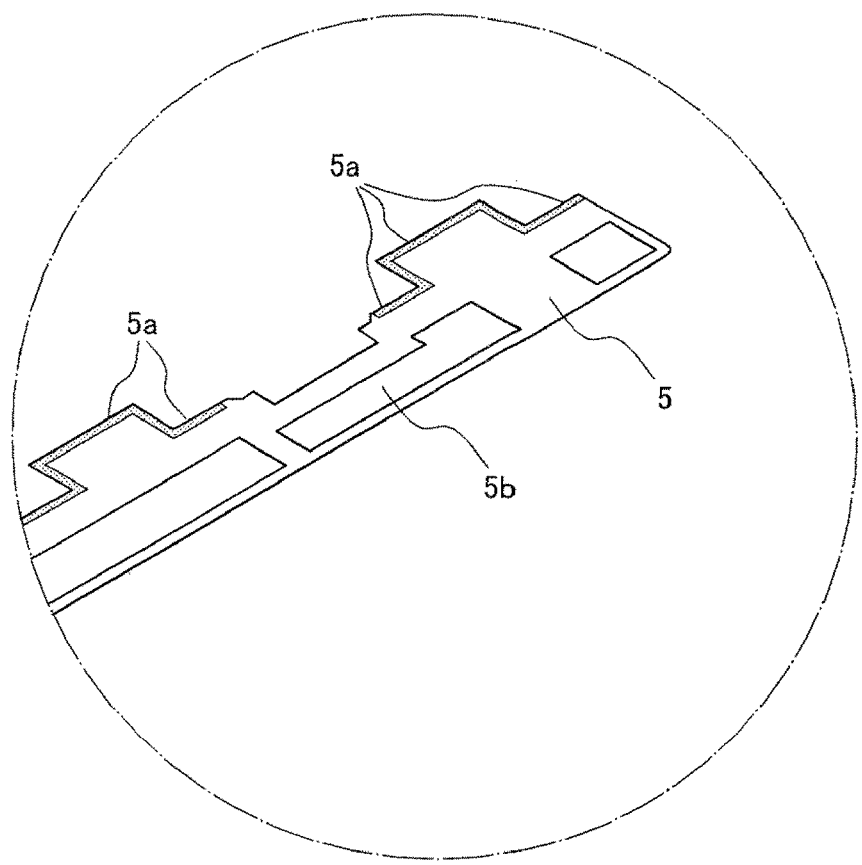
FIG. 5 is a perspective view showing a structure of a protector according to the first exemplary embodiment of the present invention and is an enlarged drawing of part A in FIG. 1.

Accordingly, in the first exemplary embodiment, as shown in FIG. 1, FIG. 4 (the cross sectional view taken along plane B in FIG. 3), and FIG. 5 (the enlarged view of part A in FIG. 1), a protector 5 is a substantially flat sheet and made of a material softer than the cover 6 is arranged on an internal surface of a side of the cover 6a. "X is softer than Y" means that scratch hardness (vulnerability in scratching) of X is relatively smaller than that of Y. The protector 5 is softer than the cover 6. At least a part of the protector 5 is fixed to the side of cover 6a using an adhesive tape or an adhesive. Then, the protector 5 is fixed so as to protrude from an edge of the cover side face 6a to outside thereof (to an upper part from the edge of the cover side face 6a in FIG. 4, for example). The cover 6 is moved in the direction of the arrow in FIG. 2 from the rear face of the backlight 11 so as to fit therein. The protector 5 is arranged between the cover side face 6a and the flexible substrate 3. Therefore, neither the flexible substrate 3 nor the IC chip 3a directly comes in contact with the cover side face 6a and an edge thereof, even if a gap between the flexible substrate 3 and the cover side face 6a in the cover 6 is small. While the cover side face 6a is guided by the protector 5, the cover 6 is fitted on the rear face of the backlight 11 as shown in FIG. 4. When the cover 6 is fitted on the rear face of the backlight, an area projecting from the edge of the cover side face 6a of the protector 5 (hereinafter, referred to as a protruding part 5a) touches the flexible substrate 3 or the IC chip 3a. Therefore, since the edge of the cover side face 6a touches neither the flexible substrate 3 nor the IC chip 3a, damage to the flexible substrate 3 or the IC chip 3a can be prevented.

The protector 5 needs to include the protruding part 5a to protrude from the edge of the cover side face 6a. The amount of projection of the protruding part 5a (a projecting length from the edge of the cover side face 6a) may be optionally adjusted, considering thickness of the cover 6, manufacture tolerance of the protector 5, and the like. For example, since the thickness of the cover 6 is usually 0.3 mm or more, 0.3 mm or more of thickness is available also as the amount of projection of the protruding part 5a. If an inside face of a side of the cover 6a has enough area to fix some parts of the protector 5 other than the protruding part 5a, the protector 5 may be fixed to the inside face thereof. When the protector 5 is fixed to the cover side face 6a, the edge of the protector 5 opposite to the protruding part 5a may be arranged so as to touch an inner surface of a bottom of the cover 6 (i.e. a part facing the rear face of the backlight 11). In such case, since the amount of projection of the protruding part 5a is kept constant when the protector 5 is fixed to the cover side face 5a, a fixing operation of the protector 5 can be performed easily.

The protector 5 needs to be made of a material which has less scratch hardness than that of the cover 6 as mentioned above. Furthermore, the protector 5 may be made of a material which has less scratch hardness than that of main component members of the flexible substrate 3 and the IC chip 3a (for example, a wiring material of the flexible substrate 3, a casing of the IC chip 3a, etc.). The protector 5 can be made of a plastic material such as polyethylene terephthalate (PET), a rubber material such as a silicone rubber, etc., for example.

Thereby, damage to the flexible substrate 3 or the IC chip 3a can be prevented more certainly.

Figures 6A, 6B, 6C, 6D, 6E:
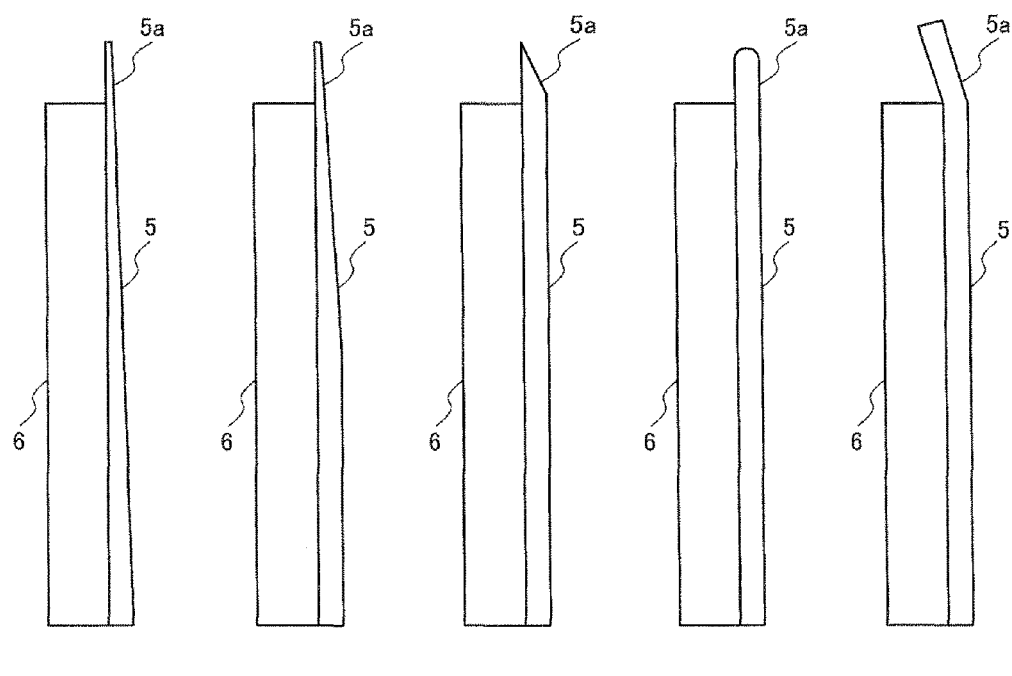
FIGS. 6A, 6B, 6C, 6D and 6E are cross sectional views showing structure of the protector according to the first exemplary embodiment of the present invention.

The thickness of the protector 5 may preferably be a predetermined thickness, so that bending of the protruding part 5a due to own weight does not occur and the flexible substrate 3 and the IC chip 3a are protected certainly. For example, the thickness of the protector 5 can be set to 50 μm-200 μm. As shown in FIG. 2 and FIG. 4, the thickness of the protector 5 may be uniform. The thickness of the protector 5 may decrease toward the protruding part 5a (FIGS. 6A and 6B). The protruding part 5a may be tapered toward the edge thereof by cutting the side face facing the flexible substrate 3 (FIG. 6C). The edge of the protruding part 5a may include a rounded shape (FIG. 6D). The protruding part 5a may bend toward the cover 6 (the opposite side to the flexible substrate 3) (FIG. 6E). Thereby, damage to the flexible substrate 3 or the IC chip 3a can be certainly prevented.

The protector 5 should be made of a material which has less scratch hardness than that of the cover 6. If the protector 5 is made of an insulating member with high electric resistance, short circuit between wiring lines of the flexible substrate 3 or electrodes of the IC chip 3a and the cover 6 can be prevented. The protector 5 may be made of a high heat conductive material (a resin material in which a high heat conductivity material is added to a base resin, for example, a silicone rubber including a carbon). Thereby, heat generated from the IC chip 3a can be diffused outward via the protector 5 and the cover 6. The protector 5 may be made of a material which is easy to slide (low friction) on a resin for protecting the flexible substrate 3 and the IC chip 3a. Thereby, the cover 6 can be attached easily. Minute unevenness may be formed on a surface of the protector 5 facing the flexible substrate 3. Thereby, since area of contact face between the flexible substrate 3 or the IC chip 3a and the cover 6 can be small, attachment of the cover 6 can be easily performed.

The protector 5 has only to be arranged in at least a part of a portion which faces the flexible substrate 3 of an internal surface of the cover side face 6a. Accordingly, the protector 5 may be arranged in all the four cover sides 6a of the cover 6. As shown in FIG. 1, the protector 5 may be arranged in only two sides thereof (here, on two long sides) facing the flexible substrate 3. The protector 5 may be arranged in only one side thereof where the flexible substrate 3 or the IC chip 3a tends to damage. For example, when gaps between the center frame 12 and the cover 6 are different in each of four sides, the protector 5 may be arranged on the side having the narrowest gap therebetween. The protector 5 may be arranged on a whole surface of each side thereof, and may be arranged in only one part of each side where the flexible substrate 3 or the IC chip 3a tends to damage. For example, when a gap between the center frame 12 and the cover 6 varies in the same side, the protector 5 may be arranged in only one part in the same side where the gap is smaller than a predetermined value.

Figure 7A:
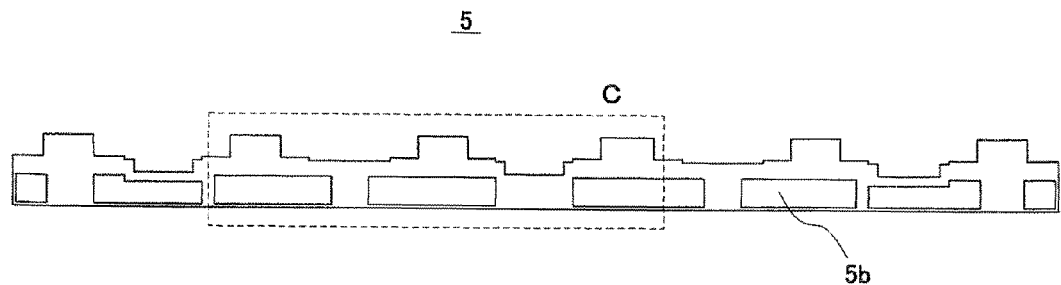
FIGS. 7A, 7B and 7C are plan views showing structure of the protector according to the first exemplary embodiment of the present invention and a positional relationship thereof with a cover.
Figure 7B:
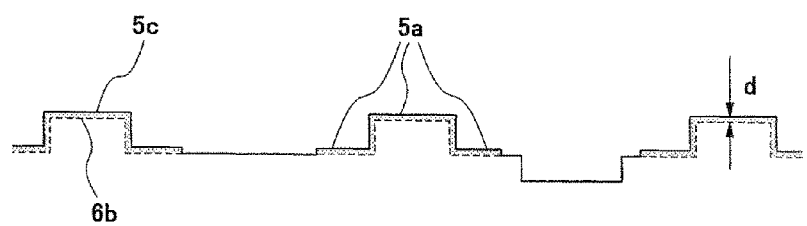
Figure 7C:
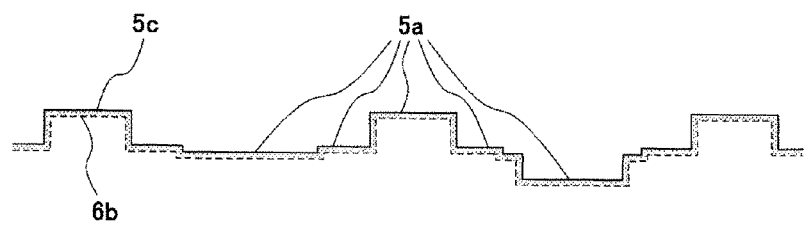

The protector 5 has only to be formed so that the protector 5 protrudes from an edge of the cover side face 6a at least in a portion corresponding to the flexible substrate 3 or the IC chip 3a. Accordingly, a shape of the protector 5 is not specified. As shown in FIG. 1, a portion of the cover side face 6a corresponding to the IC chip 3a usually projects in order to protect the IC chip 3a and diffuse heat thereof. In such a case, if a protector 5 includes a rectangular shape, the protruding part 5a of the protector 5 largely protrudes from an edge of the cover side face 6a in a dented portion of the cover side face 6a. The protruding portion may interfere in other members (for example, the frame 4) Then, in such a case, the protector 5 may have the same shape as that of the cover side face 6a as shown in FIG. 5 and FIG. 7A. The protector 5 may just protrude from a portion corresponding to the IC chip 3a (or both of the flexible substrate 3 and the IC chip 3a) in an edge of the cover side face 6a, as shown in FIG. 7B of an enlarged view of section C in FIG. 7A. In FIG. 7B, a part of an outline 5c of the protector 5 protrudes outward from an outline 6b of the cover 6. The protector 5 may protrude so that a protruding amount of the protector 5 is approximately constant in the whole protector 5, as shown in FIG. 7C. In FIG. 7C, a whole outline 5c of the protector 5 protrudes outward from the outline 6b of the cover 6. In order to improve heat diffusion and radiation effect, an opening 6b as shown in FIG. 1 may be formed in the cover side face 6a. If the protector 5 covers the opening 6b, it is difficult to obtain sufficient heat diffusion and radiation effect. In such a case, as shown in FIG. 5 and FIG. 7A, an opening 5b may be formed in the same position as that of the opening 6b of the cover side face 6a.

As described above, the first exemplary embodiment discloses a simple structure in which the substantially flat protector 5 protrudes from the edge of the cover side face 6a on an internal surface of the cover side face 6a. The protector 5 is made of a plastic, a rubber or the like which have less scratch hardness than that oft the cover 6. A defect that the flexible substrate 3 or the IC chip 3a is damaged by touching the edge of the cover side face 6a can be prevented due to such simple structure. After the LCD device 1 is assembled, the protector 5 touches the flexible substrate 3 or the IC chip 3a. No gap between the protector 5 and either the flexible substrate 3 or the IC chip 3a is made. Therefore, distance between the cover 6, and either the flexible substrate 3 or the IC chip 3a can be minimized. Therefore, a bezel size of the LCD device 1 can be minimized as much as possible. Since the protector 5 is only fixed on the cover 6, assembling workability of the LCD device can be improved.

Figure 2:
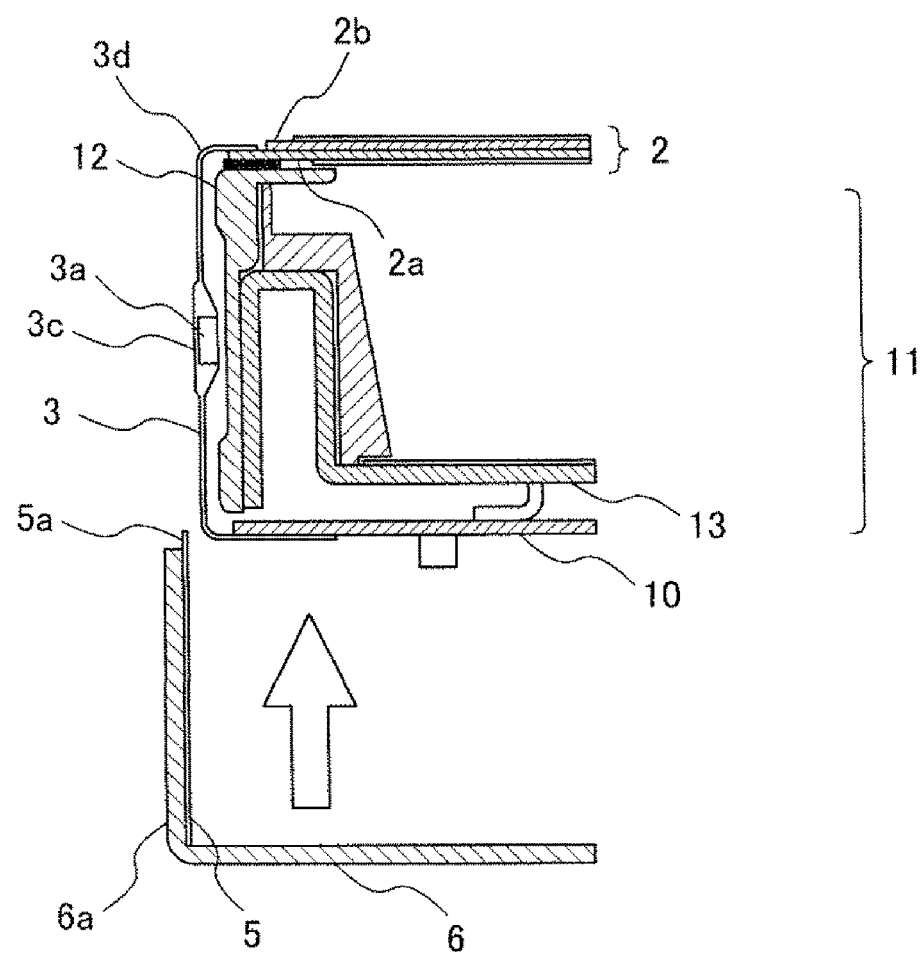
FIG. 2 is a cross sectional view showing a state of attaching a cover in the LCD device according to the first exemplary embodiment of the present invention.
Figure 8:
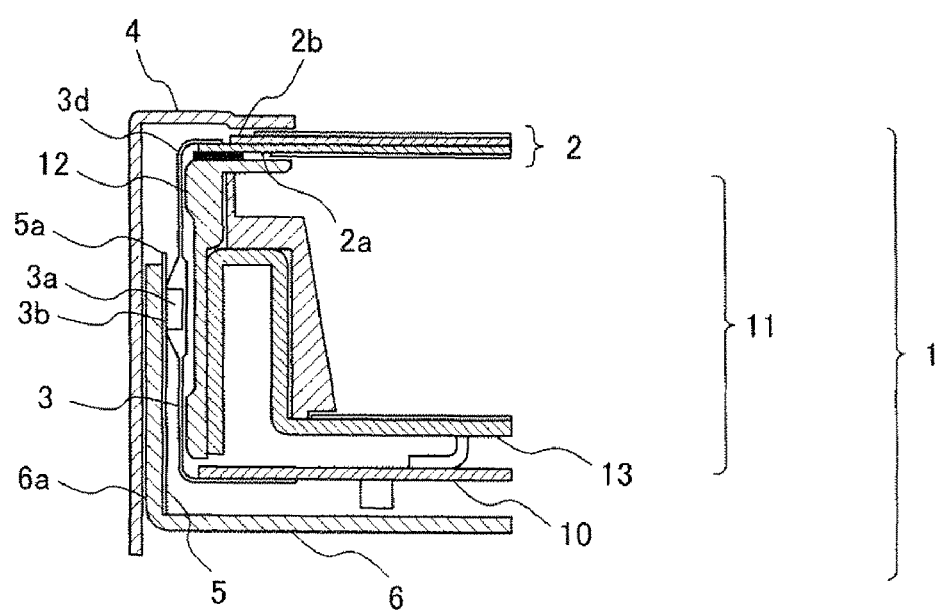
FIG. 8 is a cross sectional view showing other structure of the LCD device according to the first exemplary embodiment of the present invention.

FIGS. 1, 2, and 4 show a structure in which the IC chip 3a is arranged on the side face of the backlight 11. Even if the IC chip 3a is arranged on a face parallel to the LCD panel 2, the present invention can prevent damage to the flexible substrate 3. FIGS. 1, 2, and 4 show a structure in which the IC chip 3a is mounted on the flexible substrate 3 so that the rear face 3c thereof faces the outside, that is, a structure in which the IC chip 3a is mounted on an internal surface of the flexible substrate 3. As shown in FIG. 8, a structure in which the IC chip 3a is mounted on the flexible substrate 3 so that a surface side 3b thereof faces the outside is available. That is, a structure in which the IC chip 3a is mounted on an outside face of the flexible substrate 3 is possible. In the structure, because the IC chip 3a projects outward, the IC chip tends to touch the cover side face 6a and be damaged. However, the damage can be prevented certainly if the protector 5 of the present invention is arranged between the IC chip 3a and the cover side face 6a.

2. Second Exemplary Embodiment

An LCD device of a second exemplary embodiment of the present invention is described with reference to FIG. 9 to FIG. 12.

The LCD device 1 of the first exemplary embodiment includes the structure in which the protector 5 is arranged on the internal surface of a side face of the casing (cover 6) located in a rear face of the LCD device 1. Meanwhile, a LCD device 1 may include a structure in which the cover 6 is omitted and each component is held and fixed with the center frame 12 and the rear frame 13 of the backlight 11, and the casing (frame 4) located in a side of display surface of the LCD device 1. Then, in the second exemplary embodiment, a configuration in which a protector 5 is applied to an LCD device 1 having such structure is described.

Specifically, the LCD device 1 of the second exemplary embodiment includes an LCD panel 2, a backlight 11, a flexible substrate 3, a driving circuit substrate 10, a frame 4, the protector 5, and the like. An IC chip 3a is mounted on the flexible substrate 3. The driving circuit substrate 10 is fixed on a rear face of the backlight 11. The frame 4 is made of a hard material such as a metal represented by aluminum and stainless steel. The frame 4 covers the LCD panel 2 from the side of the display surface of the LCD panel 2, and holds internal components. The protector 5 is fixed on an internal surface of a side face of the frame 4.

An assembling method of the LCD device 1 will be described with reference to FIG. 9. Initially, the LCD panel 2 is arranged on the center frame 12 of the backlight 11. Next, a flexible substrate 3 connected to electrodes on an edge area of the LCD panel 2 is bent along side faces of the LCD panel 2 and the backlight 11 at a flexing position 3d. Then, the flexible substrate 3 is bent along a rear face of the backlight 11 and is connected to the driving circuit substrate 10. After that, the frame 4 is fitted on the display surface of the LCD panel 2. The frame 4 engages with at least one of the center frame 12 and the rear frame 13. Then, assembling of the LCD device 1 is completed as shown in FIG. 10.

In the structure of the second exemplary embodiment, the flexible substrate 3 runs from the display surface of the LCD panel 2 to the side faces of the LCD panel 2 and the backlight 11, like the first exemplary embodiment. The flexible substrate 3 is connected to the driving circuit substrate 10 fixed on the rear face of the backlight 11. After connection of the flexible substrate 3, the frame 4 is fitted on the display surface of the LCD panel 2. If an edge of the side face (frame side face 4a) of the frame 4 made of a hard material such as a metal touches the flexible substrate 3 or the IC chip 3a, the flexible substrate 3 or the IC chip 3a may be damaged.

Accordingly, in this exemplary embodiment, a substantially flat protector 5 made of a material softer than the frame 4 is arranged on an internal surface of the frame side face 4a. "Softer than the frame 4" means that scratch hardness (vulnerability in scratching) of the protector 5 is relatively less than that of the frame 4. At least a part of the protector 5 is fixed to the frame side face 4a using an adhesive tape or an adhesive so that the protector 5 may protrude from an edge of the frame side face 4a to outside (e.g. downwards from the edge of the frame side face 4a in FIGS. 9 and 10). In order to attach the frame 4, the frame 4 is moved in the direction indicated by the arrow in FIG. 9 from the side of display surface of the LCD panel 2. The protector 5 is arranged between the frame side face 4a and the flexible substrate 3. Therefore, neither the flexible substrate 3 nor the IC chip 3a directly touches the frame side face 4a and an edge thereof, even if a gap between the flexible substrate 3 and the frame side face 4a of the frame 4 is small. While the frame side face 4a is guided by the protector 5, the frame 4 is fitted on the display surface of the LCD panel 2 as shown in FIG. 9. When the frame 4 is fitted from the side of display surface, a protruding portion (protruding part 5a) of the protector 5 touches the flexible substrate 3 or the IC chip 3a. Therefore, since the edge of the frame side face 4a touches neither the flexible substrate 3 nor the IC chip 3a, damage to the flexible substrate 3 or the IC chip 3a can be prevented.

The protector 5 needs to include the protruding part 5a to protrude from the edge of the frame side face 4a like the first exemplary embodiment. The amount of projection of the protruding part 5a may be set up suitably, considering the thickness of the frame 4, manufacturing tolerance of the protector 5, and the like. For example, the protruding amount of the protruding part 5a may be nearly more than 0.3 mm from the edge of the frame side face 4a. If an inside face of side of the frame side face 4a has enough area to fix some parts of the protector 5 other than the protruding part 5a, the protector 5 may be fixed to the inside face thereof. When the protector 5 is fixed to the frame side face 4a, the edge of the protector 5 opposite to the protruding part 5a may be arranged so as to touch an inner surface of a frame part of the frame 4 (i.e. a part facing an edge area of the LCD panel). In such case, since the protruding amount of the protruding part 5a is kept constant when the protector 5 is fixed to the frame side face 4a, a fixing operation of the protector 5 can be performed easily.

The protector 5 needs to be made of the material having less scratch hardness than that of the frame 4. Furthermore, the protector 5 can be made of a plastic material such as polyethylene terephthalate (PET), a rubber material such as a silicone rubber, or the like. The thickness of the protector 5 may preferably be a predetermined thickness, so that bending of the protruding part 5a due to own weight does not occur and the flexible substrate 3 and the IC chip 3a are protected certainly. For example, the thickness of the protector 5 can be set to 50 μm-200 μm. The thickness of the protector 5 may be uniform. The thickness of the protector 5 may decrease toward the protruding part 5a. The protruding part 5a may be tapered toward the edge thereof. The edge of the protruding part 5a may include a rounded shape. The protruding part 5a may bend toward the cover 6 (the opposite side to the flexible substrate 3). The above protruding part 5a is shown with the cover 6 in FIGS. 6A through 6E. The cover 6 in FIGS. 6A through 6E corresponds to the frame 4 in the second exemplary embodiment. Thereby, damage to the flexible substrate 3 or the IC chimp 3a can be certainly prevented. If the protector 5 is made of an insulating member with high electric resistance, short circuit in wiring lines of the flexible substrate 3 or electrodes of the IC chip 3a can be prevented. The protector 5 may be made of a high heat conductive material. Thereby, heat generated from the IC chip 3a can be diffused outward via the protector 5 and the frame 4. The protector 5 may be made of a material which is easy to slide (low friction) on a resin for protecting the flexible substrate 3 and the IC chip 3a. Minute unevenness may be formed on a surface of the protector 5 facing the flexible substrate 3. Thereby, attachment of the frame 4 can be easily performed.

The protector 5 needs to be arranged in at least a part of a portion facing the flexible substrate 3 of an internal surface of the frame side face 4a. Accordingly, the protector 5 may be arranged in all the four frame sides 4a of the frame 4. The protector 5 may be arranged in only two sides thereof. The protector 5 may be arranged in only one side thereof where the flexible substrate 3 or the IC chip 3a tends to damage. The protector 5 may be arranged in only one part of each side where the flexible substrate 3 or the IC chip 3a tends to damage. For example, when a gap between the center frame 12 and the frame 4 varies in the same side, the protector 5 may be arranged in only one part in the same side where the gap is smaller than a predetermined value.

The protector 5 needs to be formed so that the protector 5 protrudes from an edge of the frame side face 4a at least in a portion corresponding to the flexible substrate 3 or the IC chip 3a. Accordingly, the protector 5 may include the same shape as that of the frame side face 4a and may just protrude from a portion corresponding to the IC chip 3a (or both of the flexible substrate 3 and the IC chip 3a) in an edge of the frame side face 4a. The protector 5 may protrude so that a protruding amount of the protector 5 is approximately constant in the whole protector 5. In the first exemplary embodiment, as shown in FIG. 7B and FIG. 7C, the whole outline 5c of the protector 5 protrudes outward from the outline 6b of the cover 6. A concept regarding a shape of the protector 5 and an edge of the frame 4 in the second exemplary embodiment is the same as a concept in which the cover 6 in the first exemplary embodiment is displaced to the frame 4. Therefore, a detailed description is omitted. An opening may be formed in the frame 4 in the same position as an opening of the frame side face 4a.

As described above, the second exemplary embodiment discloses a simple structure in which the substantially flat protector 5 protrudes from the edge of the frame side face 4a on an internal surface of the frame side face 4a. The protector 5 is made of a plastic, a rubber or the like which have less scratch hardness than that of the frame 4. A defect that the flexible substrate 3 or the IC chip 3a are damaged by touching the edge of the frame side face 4a can be prevented due to such simple structure. After the LCD device 1 is assembled, the protector 5 touches the flexible substrate 3 or the IC chip 3a. No gap between the protector 5 and either the flexible substrate 3 or the IC chip 3a is made. Therefore, distance between the cover 6, and either the flexible substrate 3 or the IC chip 3a can be minimized. Therefore, a bezel size of the LCD device 1 can be minimized as much as possible. Since the protector 5 is only fixed on the cover 6, assembling workability of the LCD device can be improved.

Figure 9:
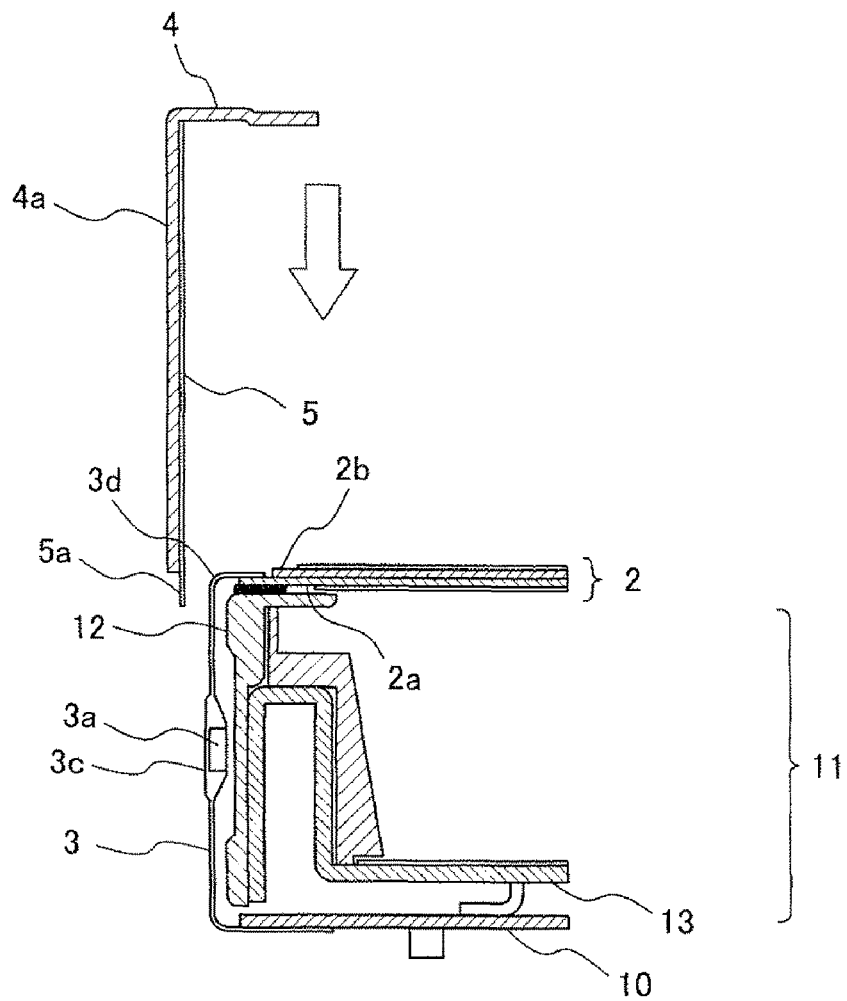
FIG. 9 is a cross sectional view showing a state at the time of a frame attachment in an LCD device according to a second exemplary embodiment of the present invention.
Figure 10:
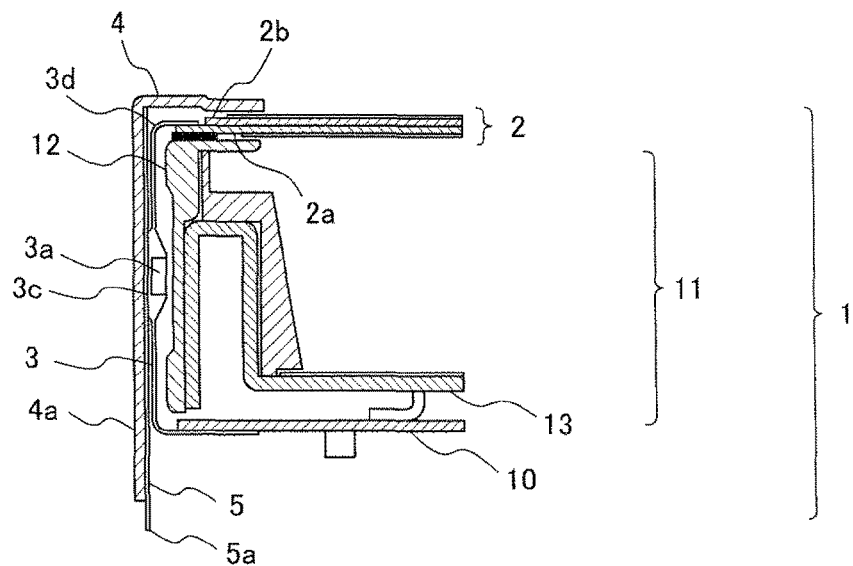
FIG. 10 is a cross sectional view showing a state after assembly of the LCD device according to the second exemplary embodiment of the present invention.
Figure 11:
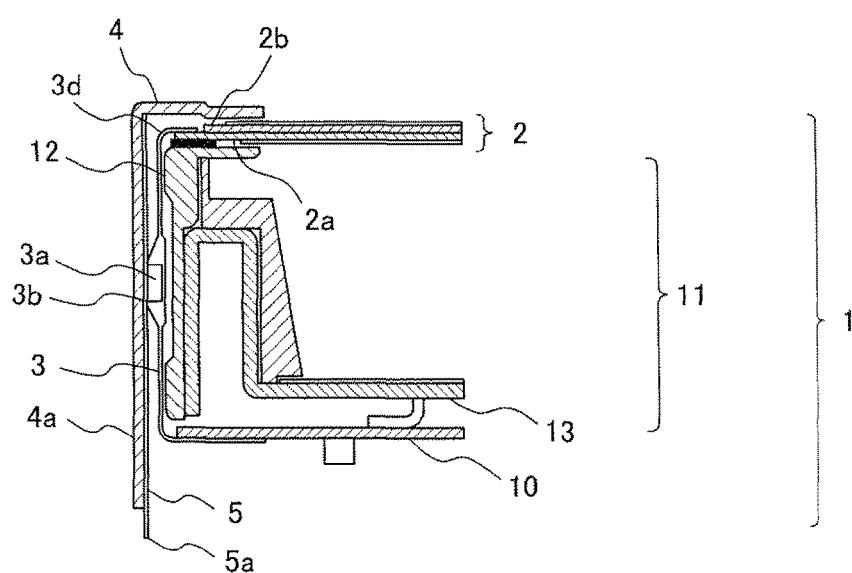
FIG. 11 is a cross sectional view showing other structure of the LCD device according to the second exemplary embodiment of the present invention.

FIGS. 9 and 10 show a structure in which the IC chip 3a is arranged on the side face of the backlight 11. Even if the IC chip 3a is arranged on a face parallel to the LCD panel 2, the present invention can prevent damage to the flexible substrate 3. FIGS. 9 and 10 show a structure in which the IC chip 3a is mounted on the flexible substrate 3 so that the rear face 3c thereof faces the outside, that is, a structure in which the IC chip 3a is mounted on an internal surface of the flexible substrate 3. As shown in FIG. 11, a structure in which the IC chip 3a is mounted on the flexible substrate 3 so that a surface 3b thereof faces the outside is available. That is, a structure in which the IC chip 3a is mounted or an outside face of the flexible substrate 3 is possible. In the structure, because the IC chip 3a projects outward, the IC chip 3a tends to touch the cover side face 6a and be damaged. However, the damage can be prevented certainly if the protector 5 of the present invention is arranged between the IC chip 3a and the cover side face 6a.

Figure 12:
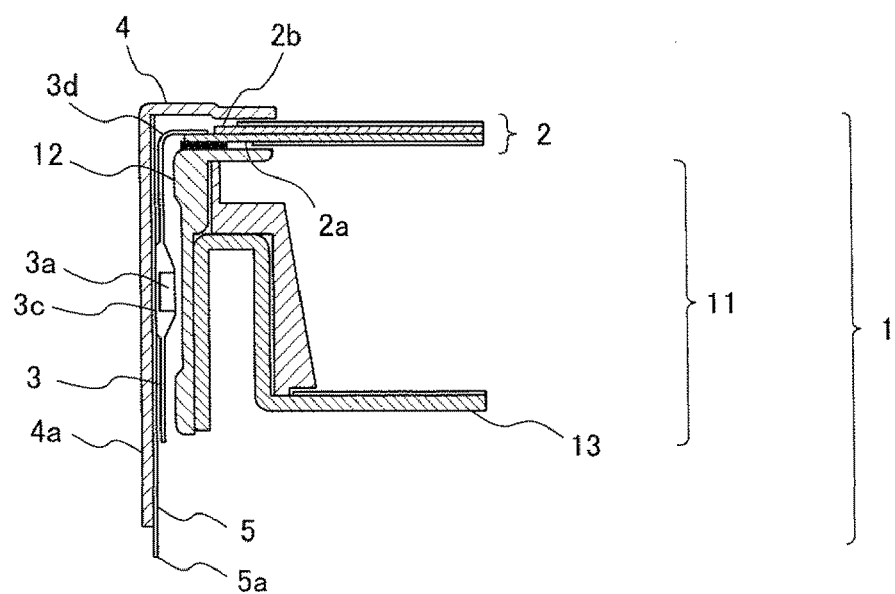
FIG. 12 is a cross sectional view showing other structure of the LCD device according to the second exemplary embodiment of the present invention.

The LCD device of FIG. 12 includes the flexible substrate 3 using a COF technology. The flexible substrate 3 includes a drive circuit and the like thereon. The protector 5 of the exemplary embodiment can be similarly applied to such LCD device, and the same effect as that of the exemplary embodiment can be obtained.

In the second exemplary embodiment, a structure of the LCD device in which the cover 6 in the first exemplary embodiment is omitted is shown. The LCD device shown in FIG. 9 to FIG. 12 may include a cover 6 for covering a rear face of the backlight 11 and a side face of the frame 4. That is, a cover 6 may be arranged outside the frame 4. Such structure makes the same effect as that of the second exemplary embodiment.

The first and the second exemplary embodiments are characterized by the protector 5, and therefore a structure and a shape of the other components are not specified. For example, any mode of an LCD panel such as IPS (In Plane Switching), TN (twisted nematic) and VA (vertical alignment) can be used. A type and a structures of a switching element (a forward stagger type, a reverse stagger type, etc.) are not specified. The frame 4 and the cover 6 can employ not only a metal but a material containing a metal, a rigid plastic, and the like.

In first and the second exemplary embodiments, the present invention is applied to the LCD device. The present invention is not limited to the above-mentioned exemplary embodiments. For example, the present invention is also applicable to a plasma display which does not need backlight, an organic electroluminescence (EL) display, a display of a field emission display (FED), etc.

The first and the second exemplary embodiments are available for not only an LCD device, but any other display device in which a display element is formed in a matrix form and a flexible substrate is fixed to a display panel.

3. Third Through Eighth Exemplary Embodiments

A third exemplary embodiment of the present invention is related to a display device which includes a display panel, a flexible substrate which is connected to a side of display surface of the display panel and is bent along a side face of the display panel, an electric circuit component mounted on a portion facing the side face of the display panel of the flexible substrate, and a casing having a side face which faces the side face of the display panel and covers at least the electric circuit component. In the display device, a substantially flat protector made of a material which has less scratch hardness than that of the casing is fixed on an internal surface of the side face of the casing. The protector includes a protruding part which protrudes from an edge of the side face of the casing at least in a position facing the electric circuit component.

A fourth exemplary embodiment of the present invention is related to a display device which includes a display panel, a flexible substrate which is connected to a side of display surface of the display panel and is bent along a side face of the display panel, an electric circuit component mounted on a portion facing the side face of the display panel of the flexible substrate, and a lower casing having a bottom face which faces a rear face of the display panel and a side face which faces the side face of the display panel and covers at least the electric circuit component. In the display device, a substantially flat protector made of a material which has less scratch hardness than that of the lower casing is fixed on an internal surface of the side face of the lower casing. The protector includes a protruding part which protrudes from an edge of the side face of the lower casing at least in a position facing the electric circuit component.

A fifth exemplary embodiment of the present invention is related to a display device which includes a display panel, a flexible substrate which is connected to a side of display surface of the display panel and is bent along a side face of the display panel, an electric circuit component mounted on a portion facing the side face of the display panel of the flexible substrate, a lower casing having a bottom face which faces a rear face of the display panel and a side face which faces the side face of the display panel and covers at least the electric circuit component, and an upper casing which covers an edge area of a display surface of the display panel and the side face of the lower casing. In the display device, a substantially flat protector made of a material which has less scratch hardness than that of the lower casing is fixed on an internal surface of the side face of the lower casing. The protector includes a protruding part which protrudes from an edge of the side face of the lower casing at least in a position facing the electric circuit component.

A sixth exemplary embodiment of the present invention is related to the display device of the forth or fifth exemplary embodiment, and furthermore the protector includes a structure in which an edge at an opposite side of a protruding part of the protector comes in contact with a bottom of a lower casing.

A seventh exemplary embodiment of the present invention is related to a display device which includes a display panel, a flexible substrate which is connected to a side of display surface of the display panel and is bent along a side face of the display panel, an electric circuit component mounted on a portion facing the side face of the display panel of the flexible substrate, and an upper casing which includes a frame part facing an edge area of a display surface of the display panel and a side face facing the side face of the display panel and in which the side face of the upper casing covers at least the electric circuit component. In the display device, a substantially flat protector made of a material which has less scratch hardness than that of the lower casing is fixed on an internal surface of the side face of the upper casing. The protector includes a protruding part which protrudes from an edge of the side face of the upper casing at least in a position facing the electric circuit component.

A eighth exemplary embodiment of the present invention is related to a display device which includes a display panel, a flexible substrate which is connected to a side of display surface of the display panel and is bent along a side face of the display panel, an electric circuit component mounted on a portion facing the side face of the display panel of the flexible substrate, an upper casing which includes a frame part facing an edge area of a display surface of the display panel and a side face facing the side face of the display panel and in which the side face of the upper casing covers at least the electric circuit component, and a lower casing which covers a rear face of the display panel and the side face of the upper casing. In the display device, a substantially flat protector made of a material which has less scratch hardness than that of the lower casing is fixed on an internal surface of the side face of the upper casing. The protector includes a protruding part which protrudes from an edge of the side face of the upper casing at least in a position facing the electric circuit component.

Figure 17:
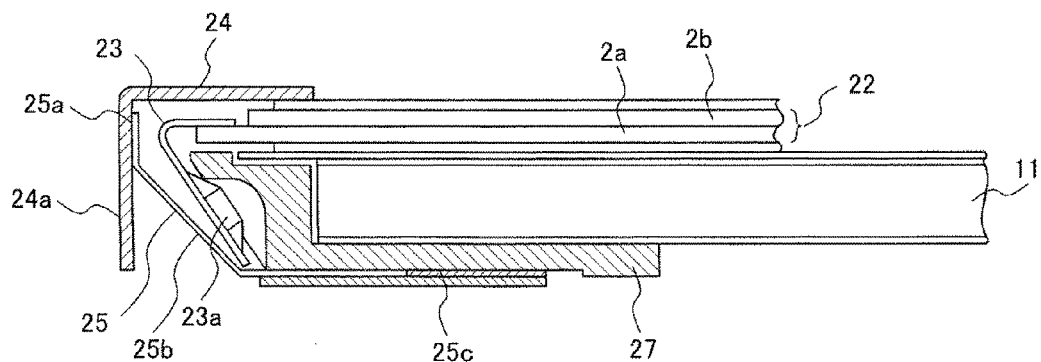
FIG. 17 is a cross sectional view showings a structure of a related LCD device.

As described in the Background Art section, a flexible substrate or an IC chip may touch an outer casing during assembly of an LCD device. Then, defects such as breaking of the trace of the flexible substrate and damage of the driver chip occur. Accordingly, in the LCD device of the patent document 2, as shown in FIG. 17, a protective cover fixed to an inner surface of the outer casing and a rear face of a casing of a backlight is provided. Otherwise, as shown in FIG. 18, a masking tape covering both of an inner face and an outer face of an edge of the outer casing is provided.

In the structure shown in FIG. 17, initially, a first fixing part 25a of the protective cover 25 is fixed to a bezel 24. After an LCD panel 22 and the backlight 11 are put together, a second fixing part 25c is fixed to a plastic chassis 27. Therefore, assembly thereof requires much time. When the LCD panel 22 and the backlight 11 are separated, the second fixing part 25c has to be removed from the plastic chassis 27. Therefore, disassembling thereof also requires much time. Further, in such structure, assembly has to be performed so that a non-fixing part 25b or the second fixing part 25c does not interfere in other components. Therefore, assembling workability is inferior.

Figure 18:
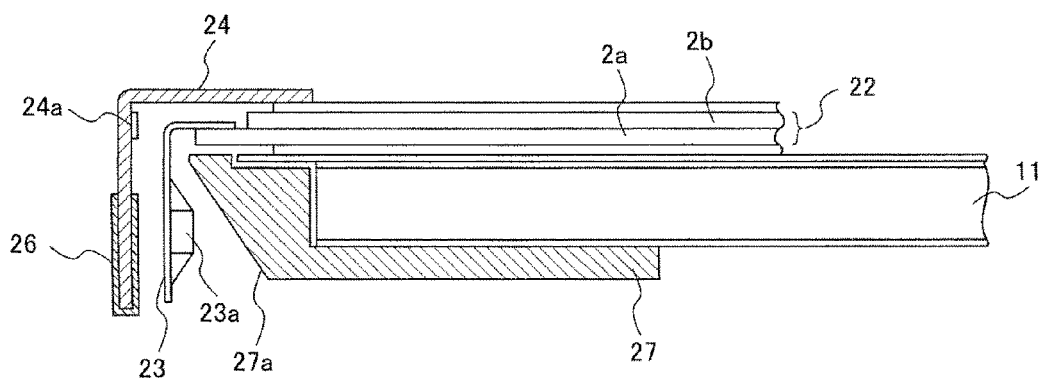
FIG. 18 is a cross sectional view showing another structure of the related LCD device.

Since the masking tape 26 has to be fixed to an inner face and an outer face of a pendent part 24a of a bezel 24 in the structure shown in FIG. 18, assembly thereof requires much time. If a thin masking tape 26 is used, neither the TAB 23 nor the IC chip 23a is fully protected by the masking tape 26. However, it a thick masking tape 26 is used, a frame size of the LCD device is large.

Thus, the LCD device disclosed in the patent document 2 having a complicated structure includes following problems. In such LCD device, since fixing of the protective cover and the masking tape requires much time during assembly of the LCD device, assembling and disassembling workability is inferior, and manufacturing cost of the LCD device is high. The size of the bezel of the LCD device is large. The problems are very important for an LCD device to which low-price and slimming down of the bezel are strongly required.

An inventor of the present invention notes that the above-mentioned problems originate in using a protector with a crooked structure. The inventor proposes a structure which can certainly protect a flexible substrate and an IC chip using a protector having a substantially flat and simple structure. Specifically, the present invention is applicable to a display device having a display panel represented by an LCD panel, a flexible substrate connected to the LCD panel, a frame for holding and fixing each component, and a cover. The flexible substrate is connected to a side of display surface of the LCD panel, and is bent along a side face of the LCD panel. An IC chip is mounted on the flexible substrate. The frame and the cover are made of a hard material such as a metal for holding and fixing each component. A substantially flat protector made of a material having less scratch hardness than those of the frame and the cover is fixed to an inner surface of a side face of the frame or the cover. The protector is arranged so that at least a part of the protector may protrude outward from an edge of the frame or the cover. The LCD device disclosed in above exemplary embodiments of the present invention includes following advantageous effects.

A first advantageous effect of the first to eighth exemplary embodiments is that damage to the flexible substrate or the IC chip at the time of assembly is prevented. In the present embodiments, a substantially flat protector having less scratch hardness than that of the casing is fixed to the inner surface of the side face of the casing, such as a frame or a cover made of a hard material such a metal. A protruding part which protrudes from an edge of the casing is provided in the protector. Therefore, in the display device with a narrow bezel in which the side face of the frame or the cover and the flexible substrate or the IC chip are closely arranged, the protruding part of the protector certainly touches the flexible substrate or the IC chip first during the assembly. Accordingly, the flexible substrate and the IC chip do not directly touch the end face of the frame or the cover.

A second advantageous effect of the first to eighth exemplary embodiments is improvement of assembling workability. In the present embodiments, when a worker assembles a frame or a cover into the display device, the worker does not need to care about contact with the flexible substrate or the IC chip. The protector has only to be fixed to one face of the frame or the cover in the present embodiments. Since it is unnecessary in the present embodiments that the protective cover and the masking tape are fixed in two or more faces as the patent document 2 requires, the protector can be fixed easily. Since the protector is substantially flat, it is unnecessary in the present embodiments to create a clearance between the protective cover and other components so that the protective cover does not interfere with the components at the time of assembly like a configuration shown in FIG. 17 of the patent document 2.

A third advantageous effect of the first to eighth exemplary embodiments is that slimming down of the bezel can be achieved. In a related art described in the Background Art section, sufficient gap between the frame or the cover, and the flexible substrate or the IC chip is required so that the frame or the cover does not touch the flexible substrate or the IC chip. However, in the first to eighth exemplary embodiments, since the gap having the same thickness as that of the protector is all that is needed, an outer shape of the frame or the cover can be reduced. The sloped protective cover shown in FIG. 17 of the patent document 2 is not required. It is prevented that the outer shape of the frame or the cover is made large due to a masking tape on an outer face of the frame or the cover a pendent part shown in FIG. 18 of the patent document 2.

A fourth advantageous effect of the first to eighth exemplary embodiments is that short circuit in the frame or the cover to the flexible substrate or the IC chip can be prevented, and heat diffusion and radiation of the LCD device can be improved. According to the first to eighth exemplary embodiments, contact of wirings of the flexible substrate or terminals of the IC chip with the frame or the cover made of a metal can be prevented, since the protector is made of a material with high electric resistance. In the first to eighth exemplary embodiments, heat generated in the IC chip and the like can be diffused outward via the protector, and the frame or the cover, since the protector is made of a material with high thermal conductivity.

4. Ninth Exemplary Embodiment

The present invention is also applicable to a common device having a casing. An LCD device of a ninth exemplary embodiment of the present invention will be described with reference to FIGS. 13A, 13B and 13C, FIGS. 14A, 14B and 14C, FIGS. 15A, 15B and 15C, and FIGS. 16A, 16B and 16C. These drawings are diagrams showing only indispensable components of the device in the ninth exemplary embodiment.

The device of the ninth exemplary embodiment includes a module 101, a flexible part 102, a fixing part 103, a casing 104, and a protector 105.

The module 101 is a component, a substrate, a unit or the like for performing a predetermined function of the device. For example, the module 101 may be an electrical component, electronic parts, a machine part, or a substrate or a board which mounts parts or components. One of specific examples of the module 101 is a module in which the liquid crystal panel 2 and the backlight 11 are combined as shown in the first and the second exemplary embodiments.

A part of the flexible part 102 is fixed to a predetermined fixing part 103. Since the flexible part 102 is deformable, a part thereof which is not fixed to the fixing part 103 is deformed due to receiving an external force. As a result, relative position between the flexible part 102 and the module 101 can change. The flexible part 102 is, for example, a flexible substrate, a cable, or the like.

The casing 104 covers the module 101 and the flexible part 102. The casing 104 corresponds to an outer surface of the device and protects the module 101 and the flexible part 102. The device may be further installed in a different device as a module.

Figures 14A, 14B, 14C:
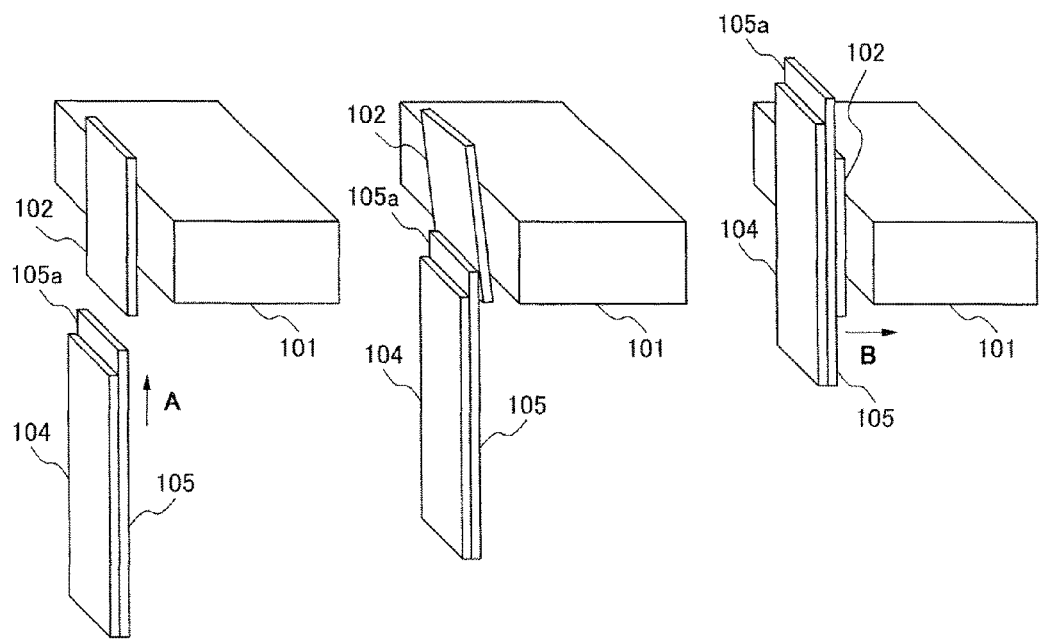
FIGS. 14A, 14B, and 14C are perspective views showing an assembly process of the device of the ninth exemplary embodiment of the present invention.

The protector 105 is fixed to the casing 104. Scratch hardness of a material of the protector 105 is less than that of the casing 104. The protector 105 is sandwiched between the flexible part 102 and the casing 104, and protects the flexible part 102 so that the flexible part 102 does not directly touch the casing 104. In FIGS. 14A, 14B and 14C, the protector 105 exists only in a portion covering the flexible part 102. Thus, the protector 105 has only to include a shape to cover the whole flexible part 102. The protector 105 may include a shape to cover the whole of the module and the whole flexible part 102. Illustration of the fixing part 103 is omitted in FIGS. 14A, 14B, and 14C.

Figures 13A, 13B, 13C:
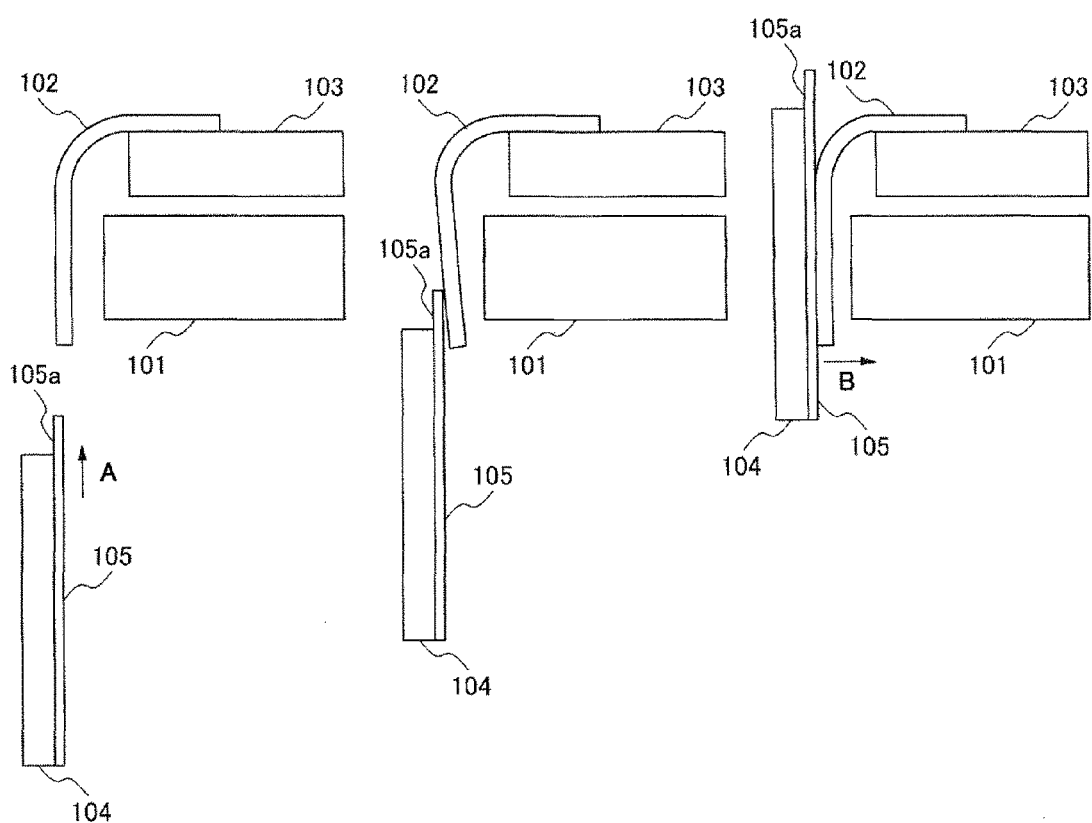
FIGS. 13A, 13B, and 13C are side views showing structure of a device of a ninth exemplary embodiment of the present invention and an assembly process of the device.

Assembling processes of the device are described with reference to drawings. A state of deformation of the flexible part 102 in the assembling processes is shown in FIGS. 13A, 13B and 13C and FIGS. 14A, 14B, and 14C. At the beginning of assembling the device, the casing 104 is moved in the direction indicated by arrow A so that the casing 104 is put on the flexible part 102 (FIG. 13A, 14A). When the casing 104 comes near the flexible part 102, the protruding part 105a of the protector 105 touches the flexible part 102 first (FIG. 13B, 14B). At that time, the flexible part 102 is deformed. The protector 105 is sandwiched between the flexible part 102 and the casing 104, when the casing 104 is moved more and reaches a position at which the casing 104 covers a flexible part 102 completely (FIG. 13C, 14C). This state is a state in which assembly of the device is completed.

In the state in which the device is assembled (FIG. 13C, 14C), the protector 105 touches the flexible part 102. At this time, the casing 104 may push the flexible part 102 via the protector 105 in the direction indicated by arrow B.

As mentioned above, when the casing 104 comes near the flexible part 102, the protruding part 105a of the protector 105 touches the flexible part 102 first. Scratch hardness of the protector 105 is less than that of the material of the casing 104. Therefore, possibility of making a scratch on the flexible part 102 can be reduced in the device of this exemplary embodiment, compared with a case in which a flexible part is covered with a casing without a protector such as the protector 105.

Figures 15A, 15B, 15C:
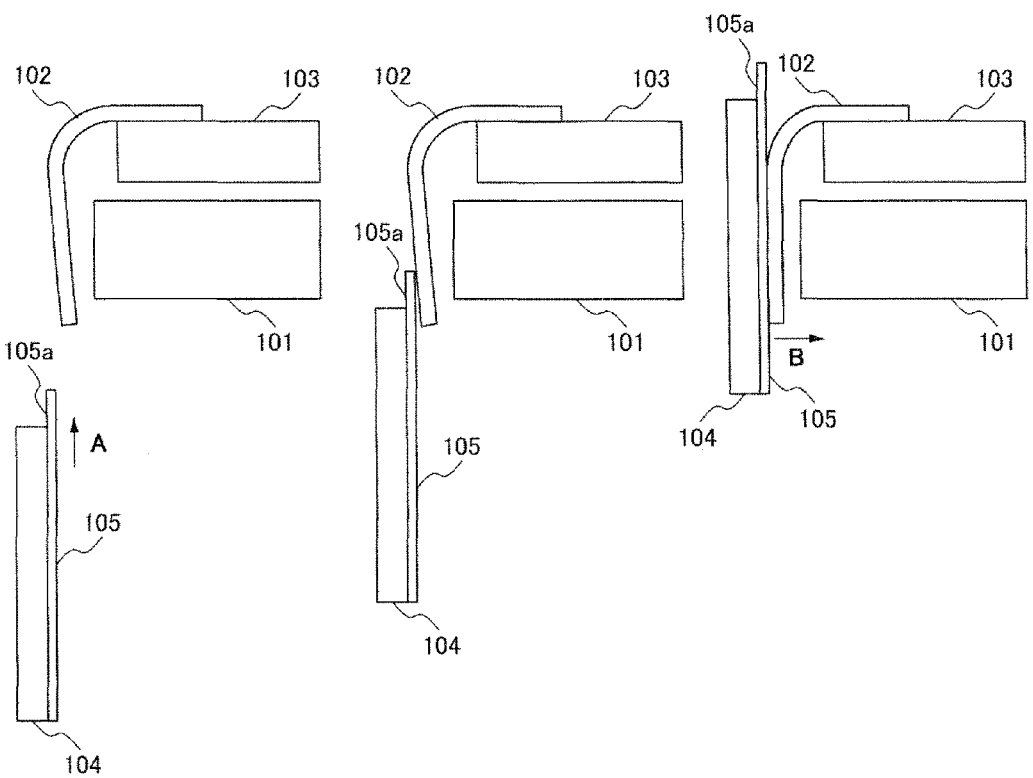
FIGS. 15A, 15B, and 15C are side views showing structure of a modification of the device of the ninth exemplary embodiment of the present invention, and an assembly process of the device.
Figures 16A, 16B, 16C:
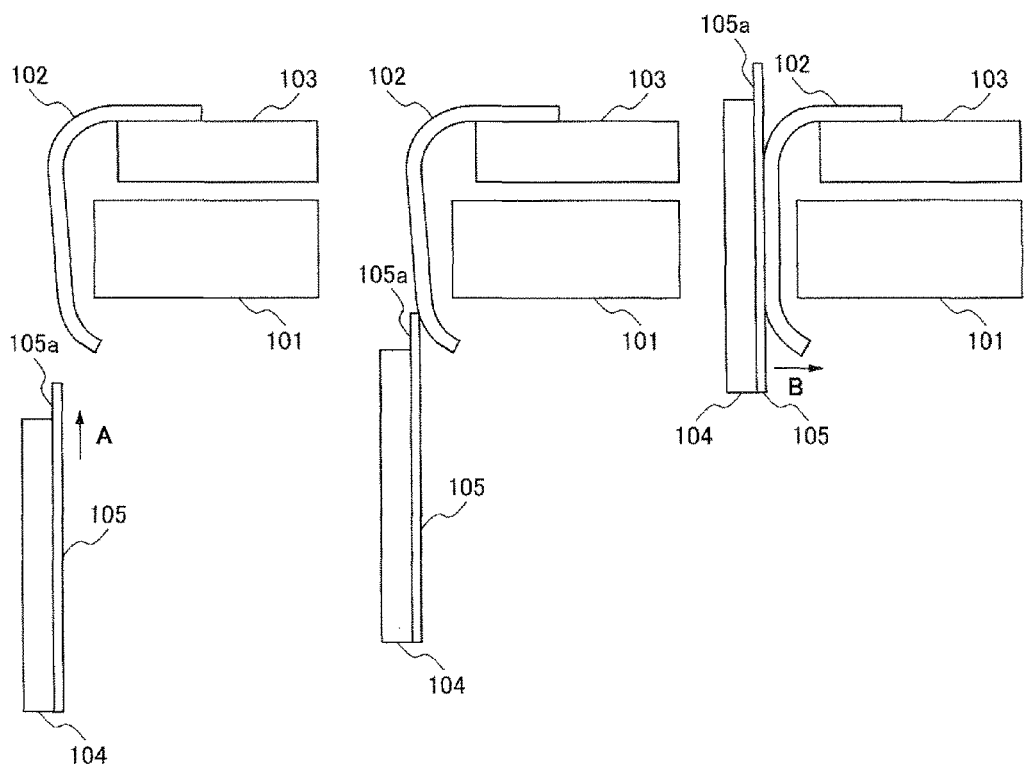
FIGS. 16A, 16B, and 16C are side views showing structure of other modification of the device of the ninth exemplary embodiment of the present invention, and an assembly process of the device.

The flexible part 102 may be bent in an opposite direction of the casing 104 as shown in FIGS. 15A and 16A. In such case, after the protruding part 105a touches the flexible part 102, the flexible part 102 certainly deforms in an opposite direction of the casing 104. Thereby, the last form in which the protector 105 is sandwiched between the casing 104 and the flexible part 102 can be certainly formed. As an example of the above-mentioned bending shape of the flexible part 102, the flexible substrate 3 in the first and the second exemplary embodiments is exemplified that bends in the direction of the rear face of the backlight 11. A bending angle of the flexible substrate 3 of the first and the second exemplary embodiments is nearly 90 degrees. However, only one portion of the flexible part 102 touching the protruding part 105a may be bent by a predetermined angle smaller than 90 degrees as shown in FIGS. 15A and 16A.

A shape of cross section of the protector 5 may be a shape including a sloped part, a taper part or a curved face part, or a bending shape shown in FIGS. 6A, 6B, 6C, 6D, and 6E in the first exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:
1. A device comprising:
a module performing a predetermined function;
a flexible unit fixed on a fixing part, of which relative position to a position of the module is variable;
a casing covering the module and the flexible unit; and
a protector which is made of material having less scratch hardness than material of the casing, wherein
the protector comprises:
a fixing part, which is a part of a first surface of the protector, fixed on the casing,
a protruding part, which is a part of the protector, protruding from an edge of the casing, and
a protecting part, which is a part of a second surface behind the first surface and excluding the protruding part, contacting with the flexible unit.

2. The device according to claim 1, wherein the protecting part is substantially flat.

3. The device according to claim 1, wherein
each of the protruding part and the protecting part is substantially flat, and
the protruding, part is bent toward the first surface at an angle relative to the protecting part.

4. The device according to claim 1, wherein the protruding part on the side of the second surface is tapered toward the edge.

5. The device according to claim 1, wherein an edge of the protruding part is rounded between the first surface and the second surface.

6. The device according to claim 1, wherein the protruding part contacts the flexible unit during an attaching process of the casing to the device, and do not contact the flexible unit when the casing has been attached to the device.

7. The device according to claim 6, wherein the protecting part contacts the flexible unit after the protruding part contacts the flexible unit during the attaching process.

8. The device according to claim 1, wherein the protector is made of a material less electrical conductive than a material of the casing.

9. The device according to claim 1, wherein the protector is made of a material of which base material includes a material having much thermal conductivity than thermal conductivity of the base material.

10. The device according to claim 1, wherein
the module is a display panel having a front surface including a display surface, a back surface opposite to the front surface, and a side surface,
the flexible unit is a flexible substrate fixed on the front surface, and is bent to the side surface,
the casing includes a side part facing the side surface and covering at least the flexible substrate, and
the fixing part is fixed on an inside surface of the side part.

11. The device according to claim 10, wherein
the flexible substrate is mounted on by an electric device in an area facing the side surface, and
the side part covers at least the electric device.

12. The device according to claim 1, wherein
the module is a display panel having a front surface including a display surface, a back surface opposite to the front surface, and a side surface,
the flexible unit is a flexible substrate fixed on the front surface, and is bent to the side surface,
the casing includes a lower casing having a bottom part facing the back surface, and a side part facing the side surface and covering at least the flexible unit, and
the protector is fixed on the side part.

13. The device according to claim 12, wherein
the flexible substrate is mounted on by an electric device in an area facing the side surface, and
the side part covers at least the electric device.

14. The device according to claim 12, wherein an edge of the protector on an opposite side of the protruding part contacts the bottom part.

15. The device according to claim 1, wherein
the module is a display panel having a front surface including a display surface, a back surface opposite to the front surface, and a side surface,
the flexible unit is a flexible substrate fixed on the front surface, and is bent to the side surface,
the casing comprises:
a lower casing which includes a bottom part facing the back surface, and a side part facing the side surface and covering at least the flexible unit; and
an upper casing covering a surrounding part of the display surface and the side surface, and
the fixing part is fixed on an inside surface of the side part.

16. The device according to claim 15, wherein
the flexible substrate is mounted on by an electric device in an area facing the side surface, and
the side part covers at least the electric device.

17. The device according to claim 15, wherein an edge of the protector on an opposite side of the protruding part contacts the bottom part.

18. The device according to claim 1, wherein
the module is a display panel having a front surface including a display surface, a back surface opposite to the front surface, and a side surface,
the flexible unit is a flexible substrate fixed on the front surface, and is bent to the side surface,
the casing includes a upper casing having a frame part facing a surrounding part of the display surface, and a side part facing the side surface and covering at least the flexible unit, and
the fixing part is fixed on an inside surface of the side part.

19. The device according to claim 18, wherein
the flexible substrate is mounted on by an electric device in an area facing the side surface, and
the side part covers at least the electric device.

20. The device according to claim 18, wherein an edge of the protector on an opposite side of the protruding part contacts the frame part.

21. The device according to claim 1, wherein
the module is a display panel having a front surface including a display surface, a back surface opposite to the front surface, and a side surface,
the flexible unit is a flexible substrate fixed on the front surface, and is bent to the side surface,
the casing comprises:
an upper casing which includes a frame part facing a surrounding part of the display surface, and a side part facing the side surface and covering at least the flexible unit; and
a lower casing covering the back surface and the side surface, and
the fixing part is fixed on an inside surface of the side part.

22. The device according to claim 21, wherein
the flexible substrate is mounted on by an electric device in an area facing the side surface, and
the side part covers at least the electric device.

* * * * *